United States Patent
Chang et al.

(10) Patent No.: US 8,730,832 B2
(45) Date of Patent: May 20, 2014

(54) METHOD AND TERMINAL FOR PERFORMING DIRECT COMMUNICATION BETWEEN TERMINALS

(75) Inventors: Sung Cheol Chang, Daejeon (KR);
Eunkyung Kim, Daejeon (KR); Hyun Lee, Daejeon (KR); Sung Kyung Kim, Daejeon (KR); Won-Ik Kim, Daejeon (KR); Chul Sik Yoon, Seoul (KR); Kwang Jae Lim, Daejeon (KR); Young-Ho Jung, Goyang-si (KR); Mi-Young Yun, Daejeon (KR); Jihoon Choi, Goyang-si (KR); Seokki Kim, Osan-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 56 days.

(21) Appl. No.: 13/475,936

(22) Filed: May 18, 2012

(65) Prior Publication Data

US 2012/0294245 A1    Nov. 22, 2012

(30) Foreign Application Priority Data

| May 19, 2011 | (KR) | .......................... 10-2011-0047404 |
| Jul. 12, 2011 | (KR) | .......................... 10-2011-0068664 |
| Sep. 9, 2011 | (KR) | .......................... 10-2011-0092029 |
| Sep. 14, 2011 | (KR) | .......................... 10-2011-0092605 |
| May 18, 2012 | (KR) | .......................... 10-2012-0052940 |

(51) Int. Cl.
*H04W 72/00* (2009.01)

(52) U.S. Cl.
USPC .......................................... 370/252; 455/450

(58) Field of Classification Search
USPC .................. 370/252, 329, 341, 350; 455/450, 455/452.1, 452.2, 455, 509
See application file for complete search history.

(56) References Cited

U.S. PATENT DOCUMENTS

| 8,060,105 B2 | 11/2011 | Jung et al. |
| 2008/0031193 A1 | 2/2008 | Laroia et al. |
| 2009/0005057 A1 | 1/2009 | Lee et al. |
| 2009/0010231 A1 | 1/2009 | Laroia et al. |
| 2009/0077264 A1* | 3/2009 | Machida ....................... 709/248 |
| 2010/0002679 A1 | 1/2010 | Zhang et al. |
| 2010/0080312 A1* | 4/2010 | Moffatt et al. ................. 375/260 |
| 2010/0254281 A1 | 10/2010 | Kim et al. |
| 2010/0260093 A1 | 10/2010 | Liu et al. |
| 2012/0263106 A1* | 10/2012 | Lee et al. ...................... 370/328 |

FOREIGN PATENT DOCUMENTS

| JP | 09-008725 A | 1/1997 |
| KR | 10-2007-0039760 A | 4/2007 |
| KR | 10-2009-0001095 A | 1/2009 |
| KR | 10-2009-0003946 A | 1/2009 |
| KR | 10-2010-0111346 A | 10/2010 |

* cited by examiner

*Primary Examiner* — Kerri Rose
(74) *Attorney, Agent, or Firm* — Rabin & Berdo, P.C.

(57) ABSTRACT

Disclosed is a method for a first terminal to perform direct communication between terminals, the method including performing direct communication with at least one second terminal by using resources allocated for direct communication between terminals, the resources including a synchronization channel used for frequency synchronization and time synchronization between terminals, and the synchronization channel including a synchronization channel preamble used for at least one of preamble detection, time offset estimation, frequency offset estimation, and channel estimation.

19 Claims, 16 Drawing Sheets

METHOD AND TERMINAL FOR PERFORMING DIRECT COMMUNICATION BETWEEN TERMINALS

This application claims priority to and the benefit of Korean Patent Application Nos. 10-2011-0047404, 10-2011-0068664, 10-2011-0092029, 10-2011-0092605, and 10-2012-0052940 filed in the Korean Intellectual Property Office on May 19, 2011, Jul. 12, 2011, Sep. 9, 2011, Sep. 14, 2011, and May 18, 2012, the entire contents of which are incorporated herein by reference.

BACKGROUND OF THE INVENTION (a) Field of the Invention

The present invention relates to a method for performing direct communication between terminals, and a terminal supporting the same.

(b) Description of the Related Art

A method of supporting direct communication between terminals by using resources allocated for cellular communication includes a method of allocating some of resources for cellular communication as resources dedicated for direct communication between terminals within cell coverage, and a method of using resources for cellular communication for both cellular communication and direct communication.

It is assumed that direction communication is established between terminals within the cell coverage of a base station. Moreover, it is assumed that a terminal intending to perform direct communication between terminals is able to know location information of resources used for direct communication between terminals over a control channel of cellular communication.

However, there is a possibility that some or all of the terminals intending to perform direct communication may be located outside the cell coverage of the base station. In this case, a terminal located outside the cell coverage of the base station cannot receive a control channel of the base station. Such a terminal cannot obtain information about the resources used for direct communication between terminals.

In general, direct communication between terminals is performed using some of resources for cellular communication. Hence, a signal from a terminal that performs cellular communication and a signal from a terminal that performs direct communication may co-exist within the cell coverage of the base station. If no synchronization is done between all or some of the terminals performing direct communication and the base station, adjacent channel interference may occur between a cellular communication signal and a direct communication signal. Also, inter-symbol interference and inter-carrier interference may occur at a receiving terminal.

SUMMARY OF THE INVENTION

The present invention has been made in an effort to provide a method for performing direct communication between terminals. Particularly, the present invention provides a method of acquiring synchronization between terminals performing direct communication.

An exemplary embodiment of the present invention provides a method for a first terminal to perform direct communication between terminals, the method including performing direct communication with at least one second terminal by using resources allocated for direct communication between terminals, the resources including a synchronization channel used for frequency synchronization and time synchronization between terminals, and the synchronization channel including a synchronization channel preamble used for at least one of preamble detection, time offset estimation, frequency offset estimation, and channel estimation.

Another embodiment of the present invention provides a method for a first terminal to perform direct communication between terminals, the method including performing direct communication with at least one second terminal by using resources allocated for direct communication between terminals, the resources including a dedicated channel for transmitting a data packet or a dedicated channel preamble used for time offset estimation or frequency offset estimation.

Another embodiment of the present invention provides a method for a first terminal to perform direct communication between terminals, the method including performing direct communication with at least one second terminal by using resources allocated for direct communication between terminals, the resources including a supplementary channel for mapping and transmitting at least one of a ranging channel, a CQI (channel quality information) channel, and a feedback channel.

An exemplary embodiment of the present invention provides a terminal including an RF (radio frequency) module and a processor, the processor being configured to perform direct communication with at least one second terminal by using resources allocated for direct communication between terminals, the resources including a synchronization channel used for frequency synchronization and time synchronization between terminals, and the synchronization channel including a synchronization channel preamble used for at least one of preamble detection, time offset estimation, frequency offset estimation, and channel estimation.

Another embodiment of the present invention provides a terminal including an RF (radio frequency) module and a processor, the processor being configured to perform direct communication with at least one second terminal by using resources allocated for direct communication between terminals, and the resources including a dedicated channel for transmitting a data packet or a dedicated channel preamble used for time offset estimation or frequency offset estimation.

Yet another embodiment of the present invention provides a terminal including an RF (radio frequency) module and a processor, the processor being configured to perform direct communication with at least one second terminal by using resources allocated for direct communication between terminals, and the resources including a supplementary channel for mapping and transmitting at least one of a ranging channel, a CQI (channel quality information) channel, and a feedback channel.

A further embodiment of the present invention provides a method for a first terminal to perform direct communication between terminals, the method including: estimating a frequency offset; setting a transmission frequency or reception frequency by using the estimated frequency offset; and performing direct communication with at least one second terminal by using the transmission frequency or reception frequency, wherein, if the first terminal is located within the cell coverage of a base station, the frequency offset is estimated based on a frequency of the base station.

A further embodiment of the present invention provides a method for a first terminal to perform direct communication between terminals, the method including: performing ranging with a base station; and transmitting a direct communication signal to a second terminal performing direct communication with the first terminal such that a difference between the time point when the second terminal receives the direct communication signal from the first terminal and the time point when the second terminal receives a cellular communication between the base station and a third terminal falls within a CP (cyclic prefix).

DETAILED DESCRIPTION OF THE EMBODIMENTS

Figure 1:
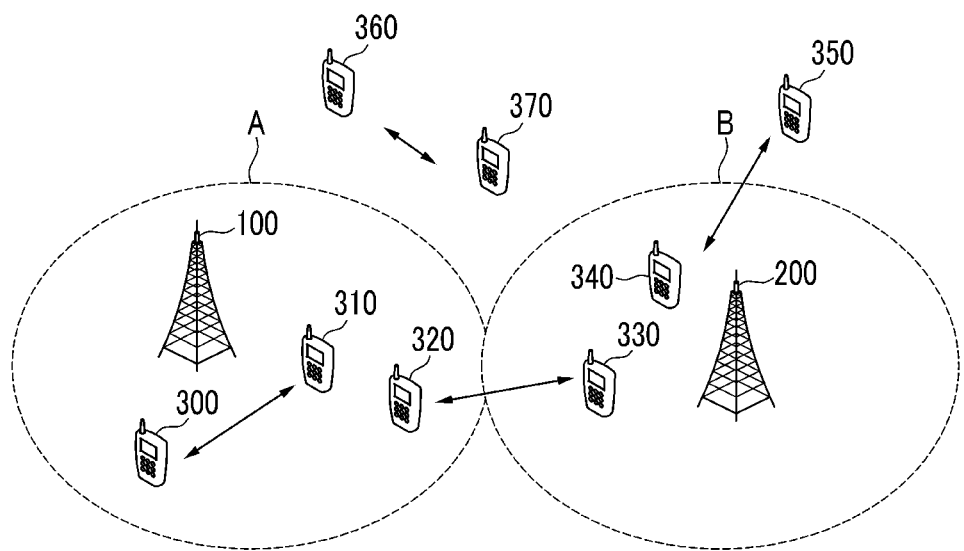
FIG. 1 is a view showing an environment that supports direct communication between terminals according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In this specification, a mobile station (MS) may designate a terminal, a mobile terminal (MT), a subscriber station (SS), a portable subscriber station (PSS), an access terminal (AT), user equipment (UE), etc., and may include the entire or partial functions of the terminal, the MT, the SS, the PSS, the AT, the UE, etc.

In this specification, a base station (BS) may designate a nodeB, an evolved nodeB (eNodeB), an access point (AP), a radio access station (RAS), a base transceiver station (BTS), a mobile multihop relay (MMR)-BS, etc., and may include the entire or partial functions of the nodeB, the eNodeB, the AP, the RAS, the BTS, the MMR-BS, etc.

This specification aims to efficiently support direct communication between terminals by using terminals and resources used for OFDMA (orthogonal frequency division multiple access)-based cellular communication.

FIG. 1 is a view showing an environment that supports direct communication between terminals according to an exemplary embodiment of the present invention. Hereinafter, direct communication for terminals may be used to refer to direct communication.

Referring to FIG. 1, at least one terminal 300, 310, 320, 330, 340, 350, 360, and 370 is located within or outside the cell coverage A of a base station 100.

Scenarios of direct communication between terminals include a scenario 1 in which two terminals 300 and 310 performing direct communication are both within the cell coverage of the same base station, a scenario 2 in which two terminals 320 and 330 performing direct communication are within the cell coverage of different base stations, a scenario 3 in which one of two terminals 340 and 350 performing direct communications is within cell coverage and the other cell is outside the cell coverage, and a scenario 4 in which two terminals are both outside the cell coverage.

The terminals 300, 310, and 320 in the cell coverage (A) are able to perform cellular communication with the base station 100, and the terminals 330 and 340 in the cell coverage B are able to perform cellular communication with a base station 200.

<First Exemplary Embodiment>

In a first exemplary embodiment of the present invention, frequency synchronization and time synchronization methods are taken into consideration, in order to reduce interference between cellular communication and direct communication.

First, the frequency synchronization method will be explained. Specifically, frequency synchronization can be achieved by minimizing a frequency offset caused by a frequency difference between the oscillators of a transmitting terminal and a receiving terminal.

A transmission frequency setting method for each scenario of direct communication between terminals terminal will be described below.

In the scenario 1, a frequency offset estimated based on the frequency of the base station 100 is previously corrected, and data for direct communication is transmitted. Each of the terminals 300 and 310 estimates the frequency offset based on the frequency of the same base station 100. Accordingly, when direct communication is performed using downlink resources, the receiving terminal 300 or 310 can receive a cellular communication signal transmitted from the base station 100 and a direct communication signal transmitted from the transmitting terminal 300 or 310 without inter-subcarrier interference. Likewise, when direct communication is performed using uplink resources, the receiving terminal 300 or 310 can receive a cellular communication signal transmitted from a terminal performing cellular communication or a direct communication signal transmitted from the transmitting terminal 300 or 310 without inter-subcarrier interference.

In the scenario 2, the terminal 320 previously corrects a frequency offset estimated based on the frequency of the base station 100, and the terminal 330 previously corrects a frequency offset estimated based on the frequency of the base station 200 and transmits data for direct communication. At this point, the frequency offset between the oscillators of the respective base stations 100 and 200 is small. Accordingly, when direct communication is performed using downlink resources, the receiving terminal 300 or 310 can receive a cellular communication signal transmitted from the base station 100 and a direct communication signal transmitted from the transmitting terminal 320 or 330 without inter-subcarrier interference. Likewise, when direct communication is performed using uplink resources, the receiving terminal 320 or 330 can receive a cellular communication signal transmitted from a terminal performing cellular communication or a direct communication signal transmitted from the transmitting terminal 320 or 330 without inter-subcarrier interference.

In the scenario 3, the terminal 340 previously corrects a frequency offset estimated based on the frequency of the base station 200, and transmits a synchronization signal to enable the terminal 350 outside the cell coverage to estimate a frequency reference. The terminal 350 outside the cell coverage previously corrects a frequency offset estimated using the synchronization signal, and transmits data for direct communication.

In the scenario 4, the terminals 360 and 370 previously store a frequency offset estimated during the process of cellular communication with a base station when they are within the cell coverage of the base station. When direct communication is performed outside the cell coverage, the stored frequency offset is previously corrected, and direct communication data is transmitted. At this point, the frequency offset between the oscillators of the respective base stations 100 and 200 is small. Hence, nearly the same frequency offset is used for cellular communication with any base station. Accordingly, direct communication can be performed without a large deviation, even if a stored frequency offset is used.

Figure 2:
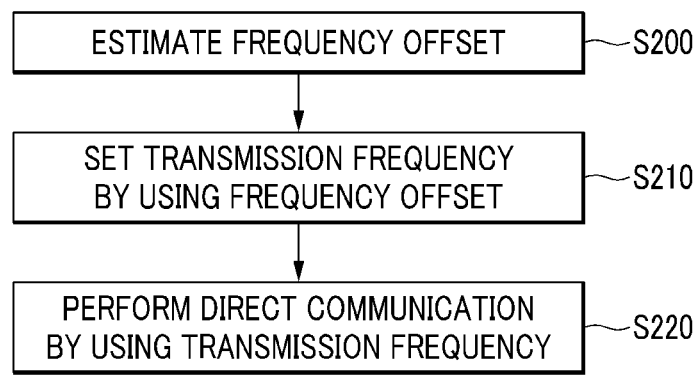
FIG. 2 is a view showing a transmission frequency setting process according to an exemplary embodiment of the present invention.

In summary, a transmission frequency setting process of a terminal performing direct communication is as shown in FIG. 2. Referring to FIG. 2, a terminal estimates a frequency offset (S200), sets a transmission frequency by using the estimated frequency offset (S210), and performs direct communication by using the transmission frequency (S220). At this point, when the terminal is located within the cell coverage of a base station, the frequency offset can be estimated based on the frequency of the base station. When the terminal is not located within the cell coverage of the base station, the frequency offset can be estimated based on a synchronization signal received from another terminal located within the cell coverage or based on a frequency stored when the terminal is located within the cell coverage of the base station.

The transmission frequency setting method may be similarly applied to reception frequency setting. That is, when a terminal is within the cell coverage of a base station, the terminal estimates a frequency offset based on the frequency of the base station, and previously corrects the estimated frequency offset and receive direct communication data.

When the terminal is outside the cell coverage of the base station, if it can receive a synchronization signal from another terminal in the cell coverage, the terminal estimates a frequency offset using the received synchronization, and previously corrects the estimated frequency offset and receives direct communication data. If the terminal cannot receive a synchronization signal from another terminal in the cell coverage, it previously corrects a frequency offset stored during cellular communication, and receives direct communication data.

Next, a method of performing time synchronization in order to reduce interference between cellular communication and direct communication will be described. To this end, the arrival time of an interference signal and a data signal may be set to fall within the length of a cyclic prefix (CP).

Figure 3:
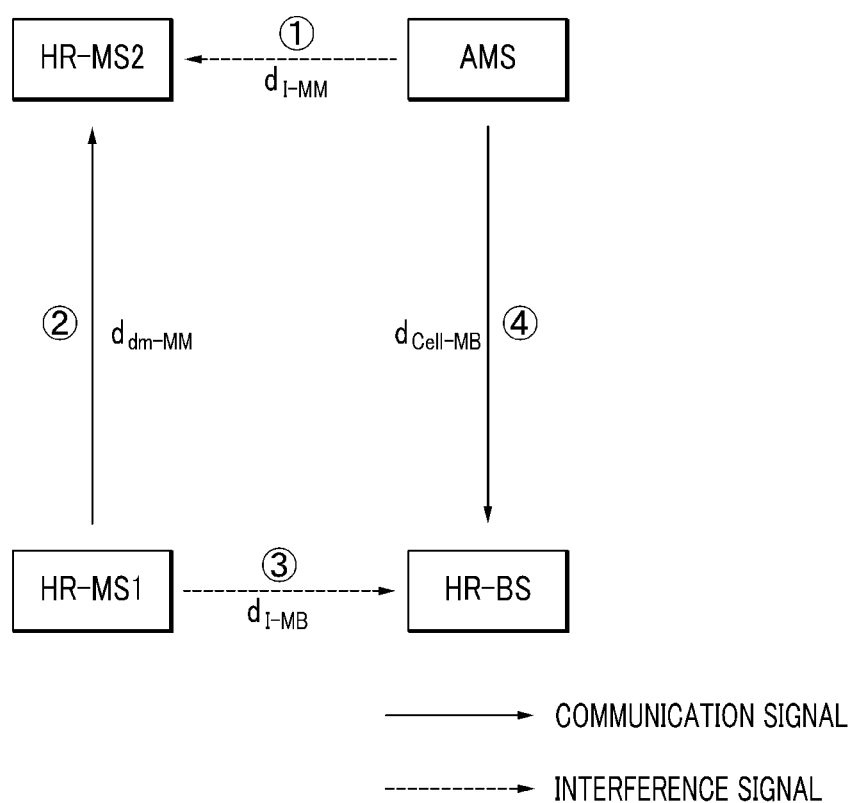
FIG. 3 and FIG. 4 are views showing an embodiment for performing direct communication between terminals by using uplink resources.
Figure 4:
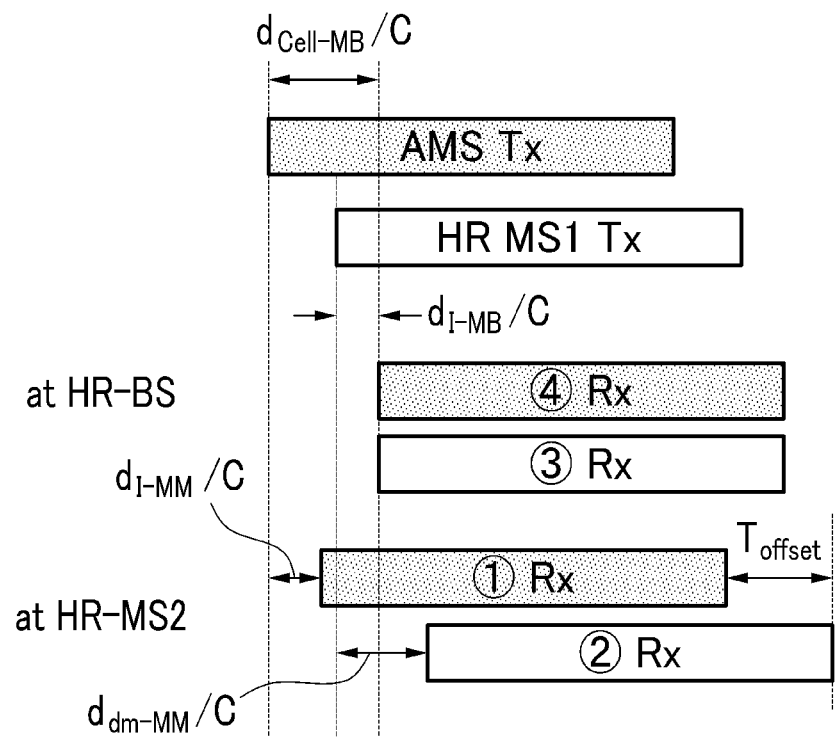

FIG. 3 and FIG. 4 are views showing an embodiment for performing direct communication between terminals by using uplink resources.

Referring to FIG. 3, HR-BS denotes a base station, AMS denotes a terminal performing cellular communication, HR-MS1 denotes a transmitting terminal involved in direct communication, and HR-MS2 denotes a receiving terminal involved in direct communication. The distance ratio between links of HR-BS, AMS, HR-MS1, and HR-MS2 is as shown in the drawing.

Some part of the uplink resources used for cellular communication may be used for direct communication between terminals depending on an FDM (frequency division multiplex) scheme. To this end, HR-MS1 performs ranging with HR-BS, and transmits a communication signal for direct communication to HR-MS2 according to an uplink time reference established by the ranging.

HR-MS2, as well as HR-BS, may receive a communication signal AMS Tx transmitted from AMS to HR-BS. A communication signal ④ transmitted from AMS to HR-BS may act as an interference signal ① for HR-MS2. Also, HR-BS, as well as HR-MS2, may receive a communication signal HR-MS1 Tx transmitted from HR-MS1 to HR-MS2. A communication signal ② transmitted from HR-MS1 to HR-MS2 may act as an interference signal ③ for HR-BS.

If a difference between the arrival time of an interference signal and the arrival time of a communication signal at the receiving side is larger than the length of a CP (cyclic prefix), interference may occur. That is, as shown in FIG. 4, when HR-BS simultaneously receives the communication signal ④ transmitted from AMS to HR-BS and the interference signal ③ transmitted from HR-MS1 simultaneously, inter-subcarrier interference caused by a time synchronization error does not occur. However, when HR-MS2 does not simultaneously receive the communication signal ② transmitted from HR-MS1 to HR-MS2 and the interference signal ① transmitted from AMS, that is, the difference $T_{offset}$ in arrival time between the communication signal ② and the interference signal ① is larger than the CP, inter-subcarrier interference may occur. Accordingly, the difference $T_{offset}$ in arrival time between the communication signal ② and the interference signal ① may be adjusted to fall within the CP length.

Equation 1 is an example of calculation of $T_{offset}$.

$$T_{offset} = |d_{I\text{-}MM} - d_{cell\text{-}MB}|/c + |d_{I\text{-}MB} - d_{dm\text{-}MM}|/c \quad \text{(Equation 1)}$$

Here, $d_{I\text{-}MM}$ denotes the propagation distance between AMS and HR-MS2, $d_{cell\text{-}MB}$ denotes the propagation distance between AMS and HR-BS, $d_{I\text{-}MB}$ denotes the propagation distance between HR-MS1 and HR-BS, $d_{dm\text{-}MM}$ denotes the propagation distance between HR-MS1 and HR-MS2, and c denotes light speed.

The peak value of $T_{offset}$ is as shown in Equation 2.

$$\max(T_{offset}) = (\text{cellular coverage} + \text{direct mode coverage})/c \quad \text{(Equation 2)}$$

Table 1 shows the peak value of $T_{offset}$ versus the size of cellular coverage and the size of direct mode coverage.

TABLE 1

| Coverage | 1000 m | 2000 m | 3000 m | 4000 m |
|---|---|---|---|---|
| 1000 m | 6.7 µs | 10.0 µs | 13.3 µs | 16.7 µs |
| 2000 m | 10.0 µs | 13.3 µs | 16.7 µs | 20.0 µs |
| 3000 m | 13.3 µs | 16.7 µs | 20.0 µs | 23.0 µs |
| 4000 m | 16.7 µs | 20.0 µs | 23.3 µs | 26.7 µs |

Here, the horizontal axis represents direct communication coverage, and the longitudinal axis represents cellular communication coverage.

By adjusting the transmission time of the communication signal transmitted from HR-MS1 to fall within the CP length so that the peak value of $T_{offset}$ falls within the CP length, inter-subcarrier interference can be minimized.

However, if the CP length is short, the propagation distance of both of the two interference signals ① and ③ is short, and both the distance between AMS and HR-BS and the distance between HR-MS1 and HR-MS2 are long, the problem of interference at HR-MS2 may become more severe. Accordingly, there is a need to reduce the degree of any interference which may occur at HR-MS2.

To this end, the transmission time of the communication signals can be adjusted so that the receiving terminal involved in direct communication can simultaneously receive the interference signals and the communication signals.

Figure 5:
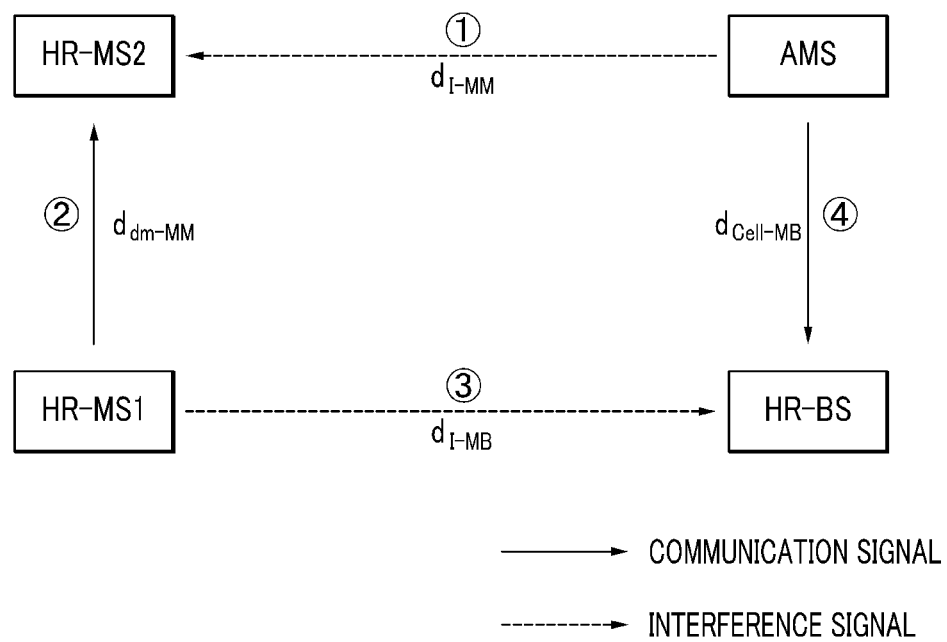
FIG. 5 and FIG. 6 are views showing another exemplary embodiment for performing direct communication between terminals by using uplink resources.
Figure 6:
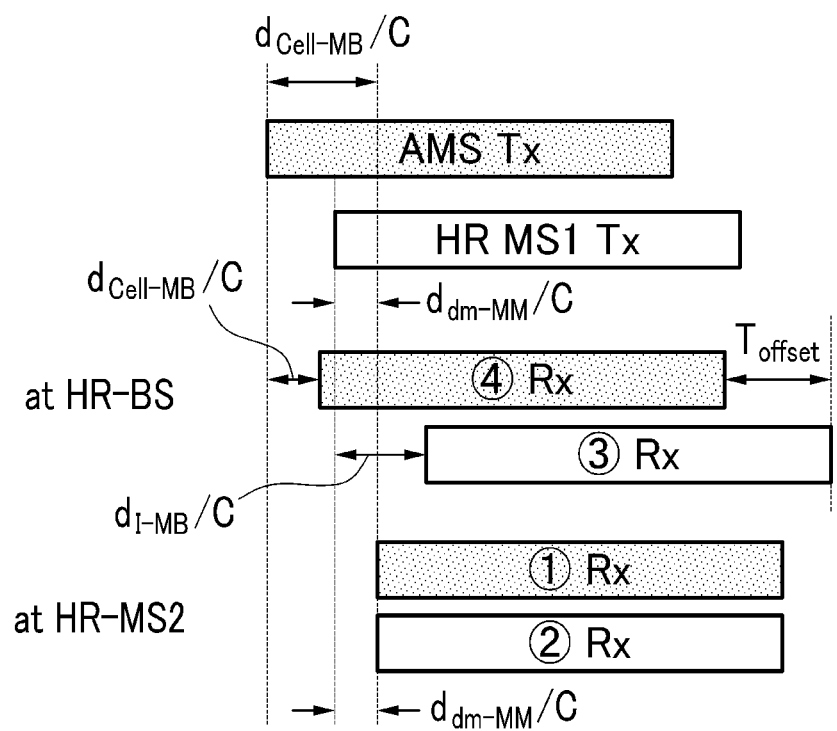

FIG. 5 and FIG. 6 are views showing another exemplary embodiment for performing direct communication between terminals by using uplink resources.

Referring to FIG. 5, HR-BS denotes a base station, AMS denotes a terminal performing cellular communication, HR-MS1 denotes a transmitting terminal involved in direct communication, and HR-MS2 denotes a receiving terminal involved in direct communication. The distance ratio between links of HR-BS, AMS, HR-MS1, and HR-MS2 is as shown in the drawing.

HR-MS2 can transmit, to HR-MS1, a message requesting to adjust the point of time when HR-MS transmits a communication signal. Accordingly, as shown in FIG. 6, HR-MS2 can simultaneously receive an interference signal ① transmitted from AMS and a communication signal ② transmitted from HR-MS1 to HR-MS2.

However, a difference $T_{offset}$ in arrival time may be generated between a communication signal transmitted from AMS to HR-BS and an interference communication signal transmitted from HR-MS1.

Equation 3 is an example of calculation of $T_{offset}$.

$$T_{offset} = |d_{I-MM} - d_{cell-MB}|/c + |d_{I-MB} - d_{dm-MM}|/c \quad \text{(Equation 3)}$$

Here, $d_{I-MM}$ denotes the propagation distance between AMS and HR-MS2, $d_{Cell-MB}$ denotes the propagation distance between AMS and HR-BS, $d_{I-MB}$ denotes the propagation distance between HR-MS1 and HR-BS, $d_{dm-MM}$ denotes the propagation distance between HR-MS1 and HR-MS2, and c denotes light speed. The peak value of $T_{offset}$ is as shown in Equation 3. The propagation distance of the communication signals ② and ④ is shorter than the propagation distance of the interference signals ① and ③ and this leads to an increase in SINR. Thus, the effect of interference is not significant.

For direct communication between terminals using uplink resources, the method explained with reference to FIGS. 3 and 4 and the method explained with reference to FIGS. 5 and 6 may be used individually or in combination.

Figure 7:
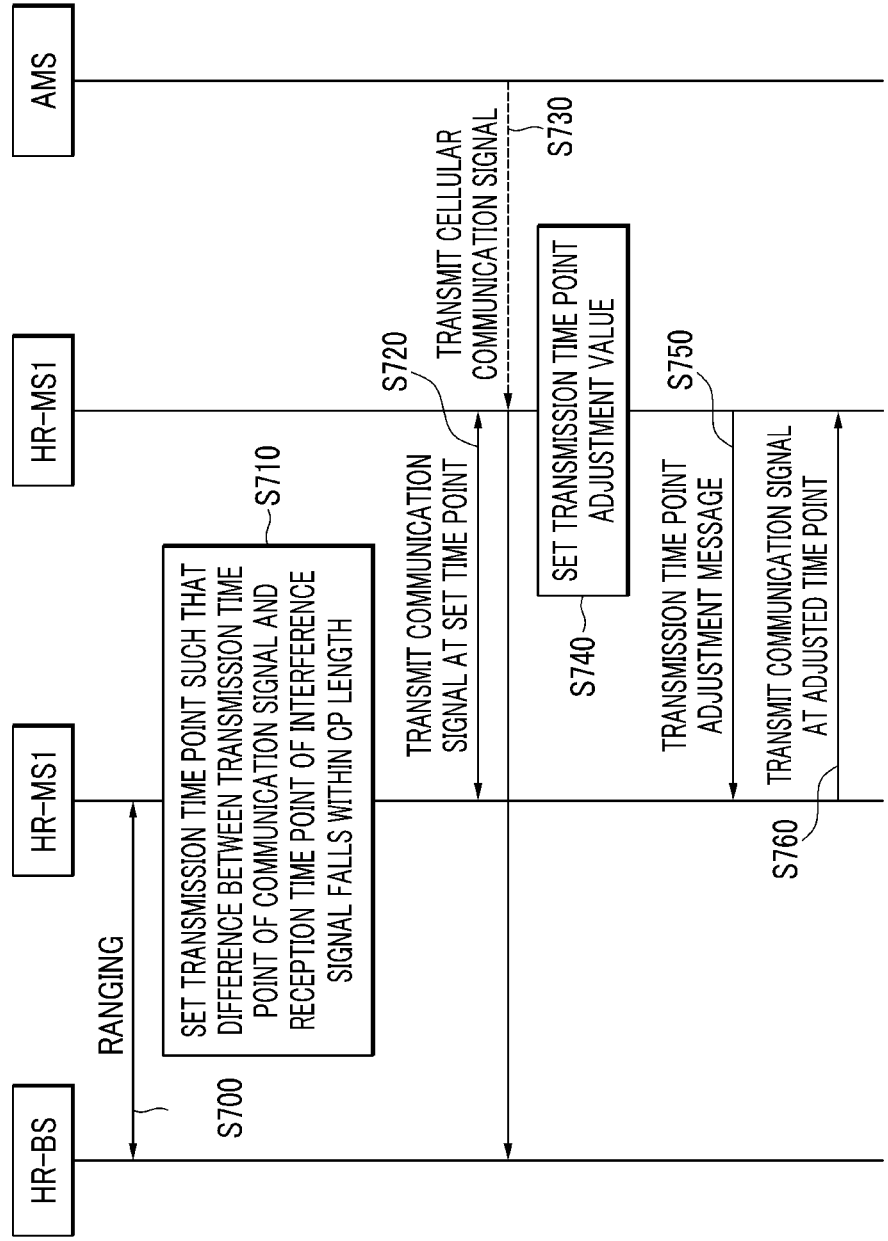
FIG. 7 is a flowchart showing a method for performing time synchronization in direct communication between terminals according to an exemplary embodiment of the present invention.

FIG. 7 is a flowchart showing a method for performing time synchronization in direct communication between terminals according to an exemplary embodiment of the present invention. A combination of the method explained with reference to FIGS. 3 and 4 and the method explained with reference to FIGS. 5 and 6 will be illustrated.

Referring to FIG. 7, HR-MS1 performs ranging with HR-BS (S700), and sets a transmission time point such that a time point when HR-MS2 receives a communication signal and a time point when HR-MS2 receives an interference signal may fall within a CP length (S710). HR-MS1 transmits a direct communication signal at a set time point (S720).

AMS transmits a cellular communication signal to HR-BS (S730). The cellular communication signal may act as an interference signal for HR-MS2.

HR-MS2 sets a transmission time point adjustment value by using a difference in reception time point between a communication signal received from HR-MS1 and an interference signal received from AMS (S740). In an example, if the difference in the reception time point between the interference transmitted from AMS and the communication signal transmitted from HR-MS1 exceeds the CP length, the transmission time point adjustment value is set such that the above difference falls within the CP length. Otherwise, if the above difference falls within the CP length, the transmission time point adjustment value may be set to 0. In another example, if the interference signal transmitted from AMS is not received, the transmission time point adjustment value may be set such that a communication signal is received at the same point in time. In another example, if the size of the communication signal transmitted from HR-MS1 is larger than that of the interference signal transmitted from AMS by a predetermined level or higher, the transmission time point adjustment value may be set to 0.

When HR-MS1 receives a message requesting to adjust the transmission time point, including the transmission time point adjustment value, from HR-MS2 (S750), it adjusts the transmission time point, and transmits a communication signal to HR-MS2 at the adjusted time point (S760).

Figure 8:
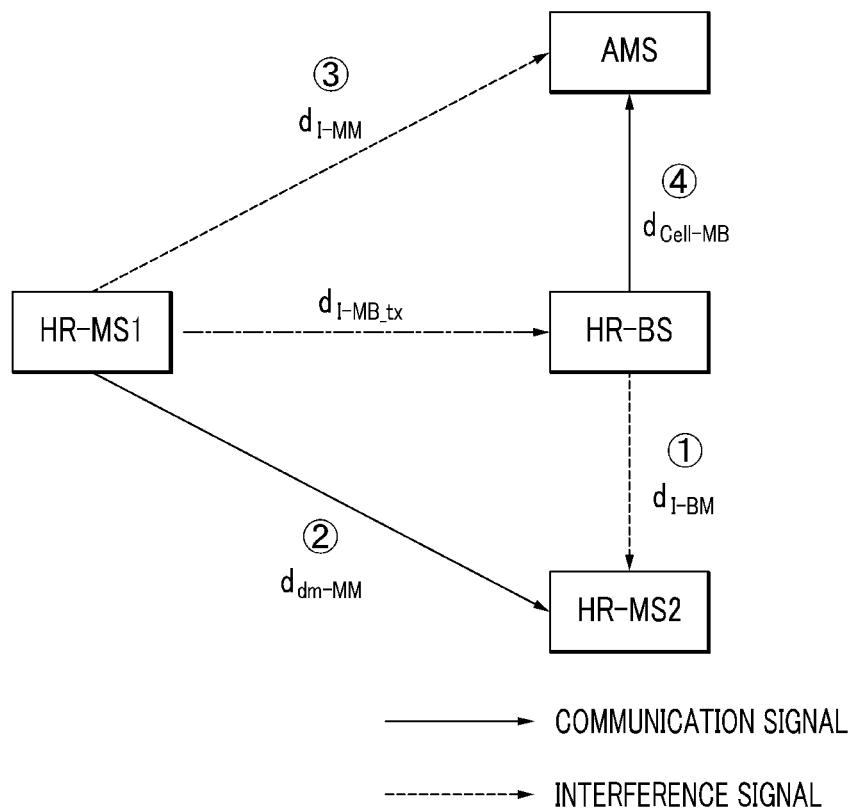
FIG. 8 and FIG. 9 are views showing an exemplary embodiment for performing direct communication between terminals by using downlink resources.
Figure 9:
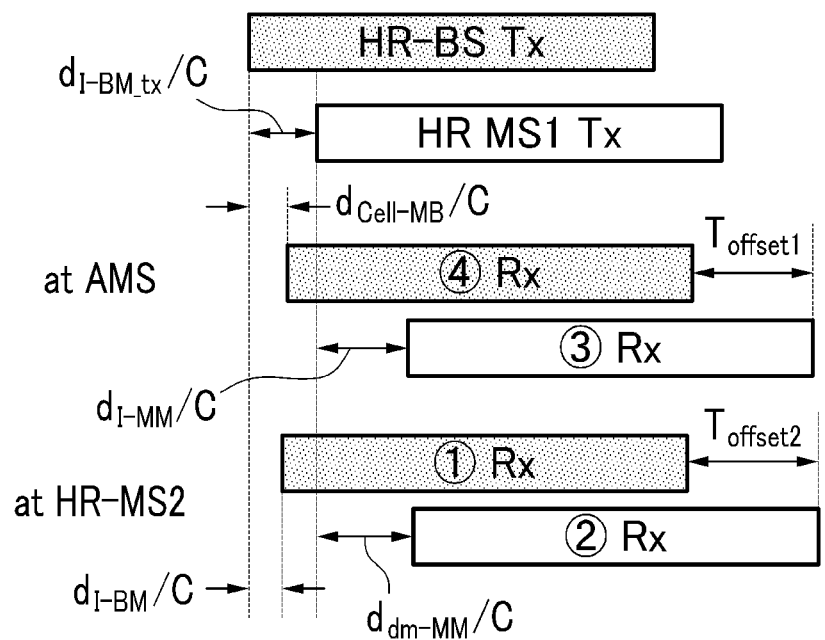

FIG. 8 and FIG. 9 are views showing an exemplary embodiment for performing direct communication between terminals by using downlink resources.

Referring to FIG. 8, HR-BS denotes a base station, AMS denotes a terminal performing cellular communication, HR-MS1 denotes a transmitting terminal involved in direct communication, and HR-MS2 denotes a receiving terminal involved in direct communication. The distance ratio between links of HR-BS, AMS, HR-MS1, and HR-MS2 is as shown in the drawing.

Some part of the uplink resources used for cellular communication may be used for direct communication between terminals depending on an FDM (frequency division multiplex) scheme.

HR-MS2, as well as AMS, may receive a communication signal HR-BS Tx that AMS transmits to HR-BS. A communication signal ④ transmitted from HR-BS to AMS may act as an interference signal ① for HR-MS2. Also, AMS, as well as HR-MS2, may receive a communication signal HR-MS1 Tx transmitted from HR-MS1 to HR-MS2. A communication signal ② transmitted from HR-MS1 to HR-MS2 may act as an interference signal ③ for AMS If a difference between the arrival time of an interference signal and the arrival time of a communication signal at the receiving side is larger than the length of a CP (cyclic prefix), interference may occur. That is, as shown in FIG. 9, if the difference $T_{\textit{offset}1}$ in reception time point between the communication signal ④ transmitted from HR-BS to AMS and the interference signal ③ transmitted from HR-MS1 is larger than the length of a CP, inter-subcarrier interference caused by a time synchronization error may occur. Also, if the difference $T_{\textit{offset}2}$ in reception time point between the communication signal ② transmitted from HR-MS1 to HR-MS2 and the interference signal ① transmitted from HR-BS is larger than the length of the CP, inter-subcarrier interference may occur. $T_{\textit{offset}1}$ and $T_{\textit{offset}2}$ may be expressed as shown in Equation 4 and Equation 5, respectively.

$$T_{\textit{offset}1} = d_{I\text{-}BM\_tx}/c + |d_{I\text{-}MM} - d_{cell\text{-}MB}|/c \quad \text{(Equation 4)}$$

$$T_{\textit{offset}2} = d_{I\text{-}BM\_tx}/c + |d_{dm\text{-}MM} - d_{I\text{-}BM}|/c \quad \text{(Equation 5)}$$

Here, $d_{I\text{-}BM\_tx}$ denotes a distance between HR-MS1 and HR-BS. If the distance between HR-MS1 and HR-BS is as long as $d_{I\text{-}BM\_tx}$, a downlink reference signal of HR-MS1 may be delayed by $d_{I\text{-}BM\_tx}/c$, as compared to the base station. Hence, a decrease in $d_{I\text{-}BM\_tx}/c$ can reduce a time error.

To this end, HR-MS1 transmits a direct communication signal at the same point in time as the downlink transmission time point of HR-BS. At this time, a result of ranging with the base station or GPS may be used. Therefore, $T_{\textit{offset}1}$ and $T_{\textit{offset}2}$ can be reduced as shown in Equation 6 and Equation 7, respectively.

$$T_{\textit{offset}1} = |d_{I\text{-}MM} - d_{cell\text{-}MB}|/c \quad \text{(Equation 6)}$$

$$T_{\textit{offset}2} = |d_{dm\text{-}MM} - d_{I\text{-}BM}|/c \quad \text{(Equation 7)}$$

By adjusting a time synchronization error during uplink transmission or downlink transmission, interference between a cellular communication signal and a direct communication signal can be reduced.

<Second Exemplary Embodiment>

In a second exemplary embodiment of the present invention, there is a method for allocating some of resources allocated for direct communication to a synchronization channel in order to achieve time synchronization and frequency synchronization between terminals performing direct communication. The synchronization channel includes a predetermined preamble. The terminals performing direct communication can perform time synchronization and frequency synchronization between terminals by using the preamble included in the synchronization channel.

Hereinafter, a preamble transmission method for efficiently performing time synchronization and frequency synchronization between terminals performing direct communication and a sequence generation method used for a preamble will be described.

To this end, a frame structure including resources for direct communication between terminals will be described.

Figure 10:
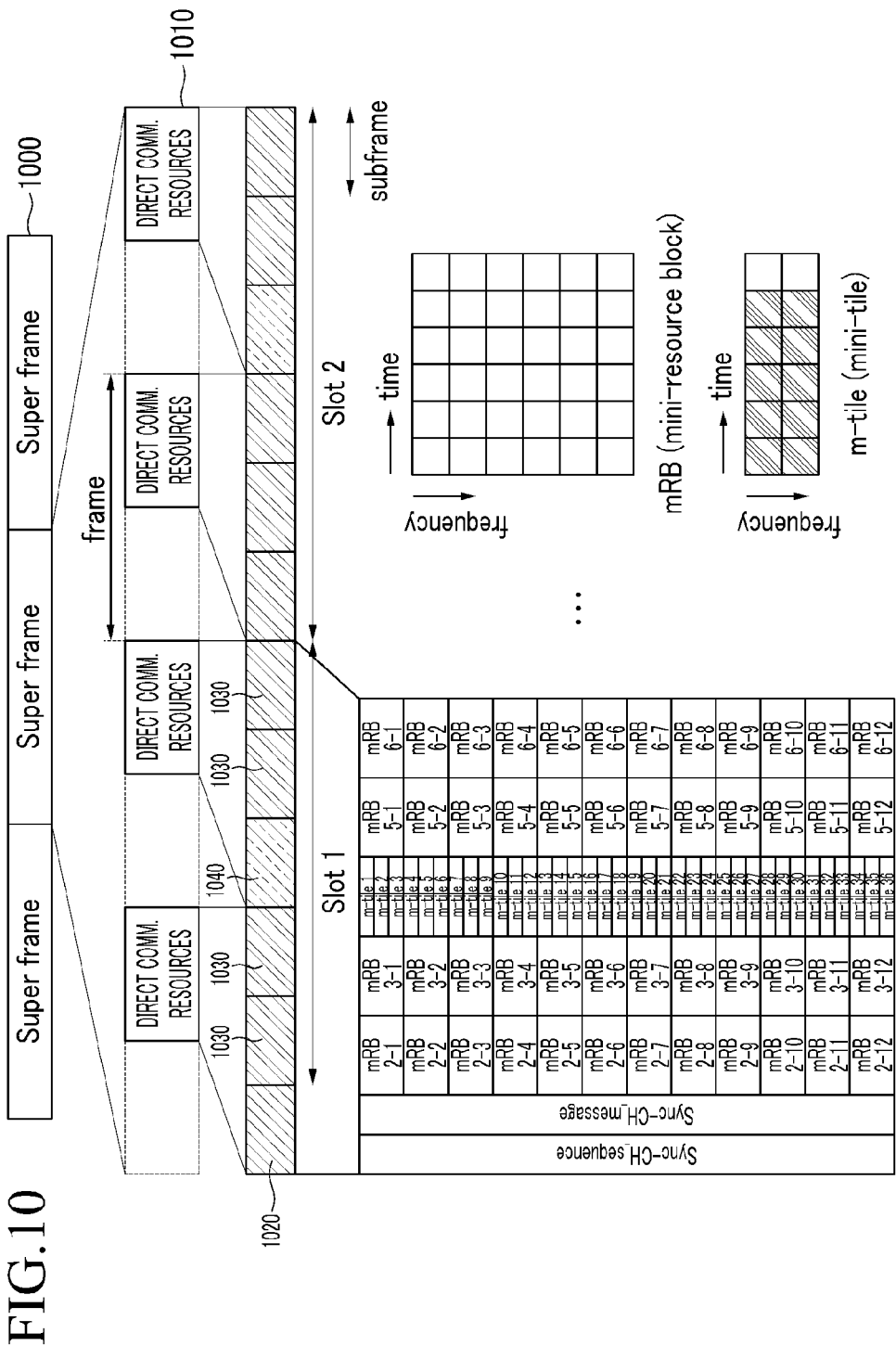
FIG. 10 is a view showing a frame structure including resources for direct communication between terminals according to an exemplary embodiment of the present invention.

FIG. 10 is a view showing a frame structure including resources for direct communication between terminals according to an exemplary embodiment of the present invention.

Referring to FIG. 10, a superframe 1000 includes a plurality of frames (e.g., four frames), and each frame includes resources 1010 for direct communication between terminals. The resources for direct communication between terminals may be allocated to a plurality of subframes (e.g., three subframes) of each frame (e.g., a total of seven subframes). The resources for direct communication between terminals may be allocated by an FDM scheme, for example.

The resources for direct communication may include at least one of a synchronization channel 1020, a dedicated channel 1030, and a supplementary channel 1040.

The synchronization channel 1020 contains synchronization information for direct communication between terminals. One synchronization channel 1020 can occupy one subframe. The synchronization channel 1020 includes a synchronization channel preamble (SYNC-CH preamble), which is a reference signal required for frequency synchronization or time synchronization between terminals, and a synchronization channel message (SYNC-CH message) including at least one of hop count information about how many hops are used to connect to the base station, base station information, information about a terminal transmitting the synchronization channel, information about a terminal receiving the synchronization channel, and information about the frame structure (e.g., a layout of the dedicate channel and the supplementary channel). The synchronization channel preamble and the synchronization channel message can be transmitted in a TDM scheme. The synchronization channel preamble may be used for at least one of preamble detection, time offset estimation, frequency offset estimation, and channel estimation.

The dedicated channel 1030 is a channel through which a data packet is exchanged. The dedicated channel 1030 may include a plurality of dedicated subchannels disposed for a physical resource having a fixed size. A dedicated subchannel may be at least one mRB. One mRB may consist of (6 subcarriers*6 OFDM symbols).

The supplementary channel 1040 is an additional channel corresponding one to one to each dedicated subchannel constituting the dedicated channel 1030. The supplementary channel 1040 uses CSMA-CA, etc., in order to acquire the right to use each dedicated subchannel. The supplementary channel is aimed at the transmission and reception of RTS and CTS for reserving a dedicated channel, the transmission of an indicator showing that a specific MAC message is being transmitted from a corresponding dedicated channel, the transmission of ACK/NACK indicative of the success or failure or packet decoding in a packet transmission process, the transmission of CQI, CSI, RI (rank information), etc., required for link adaptation, the transmission of a synchronization channel reception response message, a ranging response, and a ranging signal which are required to maintain and acquire MCS transmission synchronization, the transmission of a short-length MAC management message, the transmission of a physical layer signaling signal, and the like. The supplementary channel may be positioned at a different slot from that of a one-to-one corresponding dedicated subchannel so as to receive feedback information about the corresponding dedicated channel. A link adaptation method for the supplementary channel includes a fixed modulation method and a method of adjusting transmission power using a code rate. If one packet is transmitted through a plurality of dedicated subchannels, the packet can be repeatedly encoded and transmitted to the supplementary channel corresponding to the plurality of dedicated subchannels.

Figure 11:
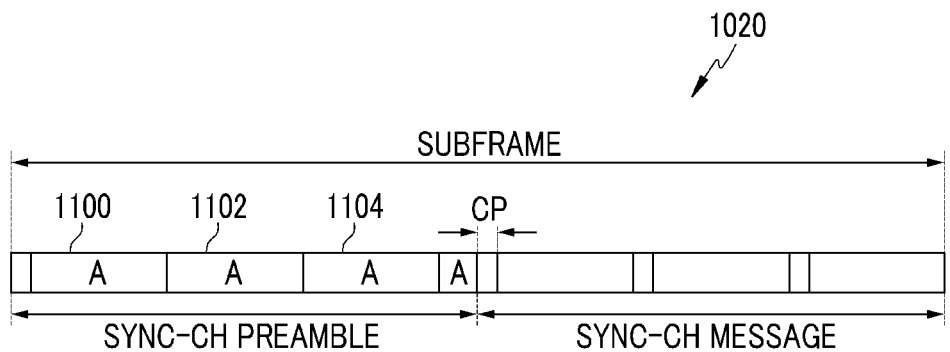
FIG. 11 shows a structure of a synchronization channel according to an exemplary embodiment of the present invention.

FIG. 11 shows a structure of a synchronization channel according to an exemplary embodiment of the present invention.

Referring to FIG. 11, a first time domain preamble 1100 in a time domain of the synchronization channel 1020 is transmitted along with a CP (cyclic prefix), and second and third time domain preambles are transmitted without a CP. The same sequence is repeatedly transmitted to the first time domain preamble 1100 and the second and third time domain preamble 1102 and 1104. A 1024 sample length preamble can be repeated (3+α) times in the time domain. The same sequence can be repeatedly transmitted in a frequency domain as well.

Figure 12:
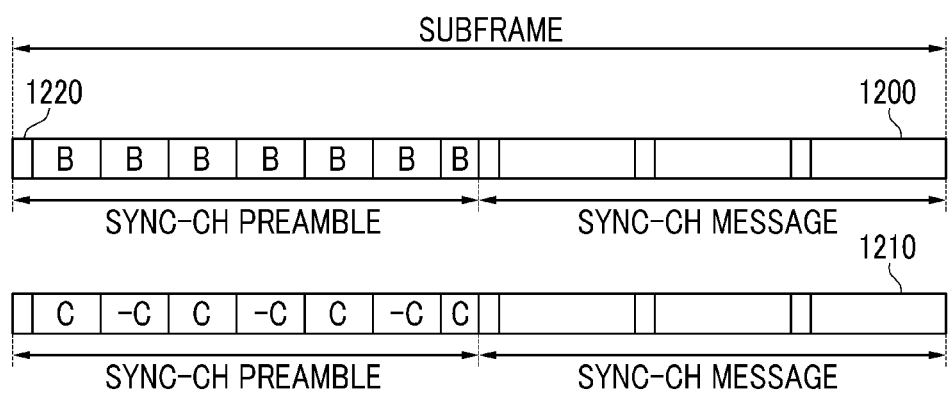
FIG. 12 shows a structure of a synchronization channel according to another exemplary embodiment of the present invention.

FIG. 12 shows a structure of a synchronization channel according to another exemplary embodiment of the present invention.

Referring to FIG. 12, in the case that resources for cellular communication and resources for direct communication are divided according to the FDM scheme, 72 consecutive subcarriers may be allocated for the synchronization channel 1020. The synchronization channel preamble is transmitted in 36 subcarriers among the 72 consecutive subcarriers, and the same preamble pattern is repeated for a duration of 3 OFDM symbols. To this end, a 36-bit length binary sequence may be allocated to the 72 subcarriers on the frequency axis, and converted into a time domain preamble by using IFFT (inverse fast Fourier transform). The size of FFT, as used herein, is identical to the size of IFFT used for cellular communication.

Accordingly, if the receiving terminal estimates time synchronization in the frequency domain by using the synchronization channel preamble, inter-subcarrier interference caused by a frequency error can be reduced. That is, the accuracy of time synchronization estimation in the frequency domain can be increased.

The synchronization channel preamble can be defined by two patterns: sequence 0 1200 and sequence 1 1210, and represented by a 512 sample length basic pattern. For sequence 0 1200, the 512 sample length basic pattern B is repeated two times to constitute a time domain preamble with a 1024 sample length. For sequence 1 1210, a 512 sample length basic pattern C and a pattern –C obtained by multiplying the basic pattern C by –1 are combined together to constitute a time domain preamble with a 1024 sample length. The time domain preamble with 1024 sample length may be repeated (3+α) times in order to make the synchronization channel preamble have a length of 3 OFDM symbols. The first time domain preamble (or first OFDM symbol) is transmitted along with a CP (cyclic prefix) 1220, and the second and third time domain preambles are transmitted without a CP. α is defined as in Equation 8.

$$\alpha = 2N_{CP}/N_{FFT} \quad \text{(Equation 8)}$$

Here, $N_{cp}$ denotes the length of a CP, and $N_{FFT}$ denotes an FFT size.

By transmitting the first time domain preamble along with a CP and then repeatedly transmitting the remaining time domain preambles without a CP, the phase of a preamble sequence has cyclic continuity. This is advantageous for the receiving terminal to estimate time synchronization. Moreover, the preamble sequence is repeated in the frequency domain as well, whereby a frequency error can be easily estimated.

Also, if the basic pattern of the synchronization channel preamble is reduced to a 512 sample length, the complexity of time synchronization estimation at a receiver can be lowered, as compared to a 1024 sample length. Further, the range of frequency error estimation can be enlarged two times.

Figure 13:
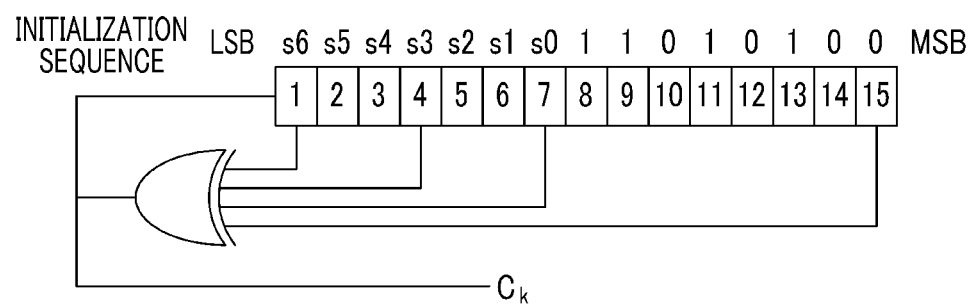
FIG. 13 shows a structure of a PRBS generator.

A structure of a PRBS (pseudo random binary sequence) generator for generating a sequence used for a synchronization channel preamble according to an exemplary embodiment of the present invention is as shown in FIG. 13. A polynomial expression for the PRBS generator is $1+X^1+X^4+X^7+X^{15}$. An initial register value of PRBS is defined as Equation 9.

$$b14\ldots b0=1,1,0,1,0,1,0,0,0,0,0,0,0,0,0 \quad \text{(Equation 9)}$$

Here, b0 denotes the LSB (least significant bit) of a PRBS seed. Sequence 0 $S_k^0$ and sequence 1 $S_k^1$ of the synchronization channel preamble are defined as Equation 10 and Equation 11, respectively. As such, a preamble sequence, which is different from an existing ranging code, can be generated by varying the initial register value while using an existing ranging code generator. This allows the same terminal to support both cellular communication and direct communication while minimizing changes to a model structure of the terminal.

$$S_k^0 = \begin{cases} 0, & k = 0, 2, \ldots, 70 \\ 1 - 2 \times C_k, & k = 1, 3, \ldots, 71 \end{cases} \quad \text{(Equation 10)}$$

$$S_k^1 = \begin{cases} 1 - 2 \times C_k, & k = 0, 2, \ldots, 70 \\ 0, & k = 1, 3, \ldots, 71 \end{cases} \quad \text{(Equation 11)}$$

Here, $C_k$ denotes a binary code generated by the PRBS generator, and $C_0$ denotes the first output of PRBS. $S_k^j$ denotes the k-th bit of a j-th sequence. The k-th bit may be transmitted in the k-th subcarrier among 72 consecutive subcarriers allocated for the synchronization channel 1020.

For $S_k^0$, 1 or –1 may be transmitted in odd-numbered subcarriers among the 72 consecutive subcarriers allocated for the synchronization channel 1020, and no signal may be transmitted through even-numbered subcarriers.

For $S_k^1$, 1 or –1 may be transmitted in even-numbered subcarriers among the 72 consecutive subcarriers allocated for the synchronization channel 1020, and no signal may be transmitted through odd-numbered subcarriers.

A transmitting terminal involved in direct communication between terminals and transmitting the synchronization channel 1020 may select and transmit either sequence 0 or sequence 1. A receiving terminal has to detect both of the two sequences because it is not aware of which sequence the transmitting terminal has transmitted.

The two sequences may be used for various purposes.

In an example, terminals involved in direct communication in the same area are divided into two groups, and the first group uses sequence 0 and the second group uses sequence 1. This can increase the probability of detection of a collision that occurs when two or more terminals transmit a synchronization channel at the same point in time.

In another example, a terminal using a GPS signal as a reference signal uses sequence 0, and a terminal using a base station signal as a reference signal uses sequence 1. This allows the receiving terminal to know the reference signal that the transmitting terminal uses.

In another example, a terminal whose synchronization signal has higher accuracy than a reference value uses sequence 0, and a terminal whose synchronization signal has lower accuracy than the reference value uses sequence 1. This allows the receiving terminal to know the accuracy of time synchronization and frequency synchronization of the synchronization channel.

In another example, a terminal supporting IEEE 802.16m uses sequence 0, and a terminal supporting IEEE 802.16e-2009 uses sequence 1. This allows the receiving terminal to distinguish the communication standards of the transmitting terminal.

<Third Exemplary Embodiment>

As explained in the second exemplary embodiment, a synchronization channel can be transmitted in order to achieve time synchronization and frequency synchronization between terminals during direct communication between the terminals. Unlike cellular communication, in which a preamble for synchronization is periodically received from a base station, a time synchronization error or a frequency synchronization error may be increased in direct communication. Also, in the case that terminals performing direct communication move during data transmission and reception, the distance between the terminals may be changed, thus increasing the time synchronization error.

In the third exemplary embodiment of the present invention, a data packet or predefined dedicated channel preamble is transmitted over a dedicated channel. For a structure of the dedicated channel and a structure of a frame including the dedicated channel, FIG. 10 can be referred to.

As used herein, the data packet is a packet which is generated according to channel encoding and modulation schemes pre-arranged between a transmitting terminal and a receiving terminal. The dedicated channel preamble is a signal which is non-periodically transmitted upon a request from the receiving terminal or when the transmitting terminal determines that transmission is required. The dedicated channel preamble may be used for at least one of time synchronization error estimation, frequency synchronization error estimation, and channel status estimation.

A structure of a PRBS (pseudo random binary sequence) generator for generating a sequence used for a dedicated channel preamble according to an exemplary embodiment of the present invention is as shown in FIG. 13. A polynomial expression for the PRBS generator is $1+X^1+X^4+X^7+X^{15}$. An initial register value of PRBS is defined as Equation 12.

$$b14 \ldots b0 = 1,1,0,1,0,1,0,0,0,0,0,0,0,0,0 \quad \text{(Equation 12)}$$

Here, b0 denotes the LSB (least significant bit) of a PRBS seed.

Sequence $S_k$ of the dedicated channel preamble is defined as in Equation 13.

$$S_k = 1 - 2 \times C_k, k = 72, 73, \ldots, 143 \quad \text{(Equation 13)}$$

Here, $C_k$ denotes a binary code generated by the PRBS generator of FIG. 13, and $C_0$ denotes the first output of PRBS.

Figure 14:
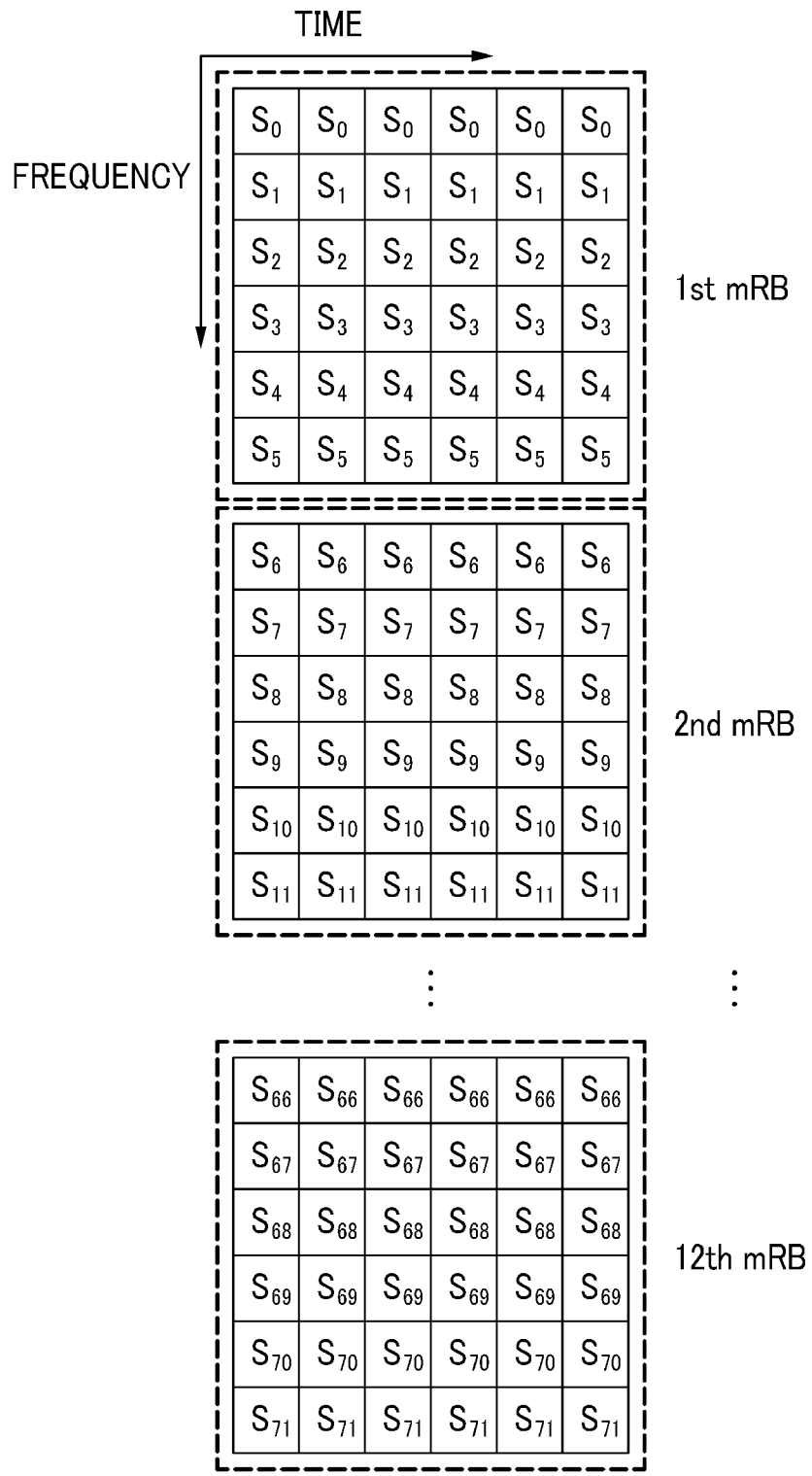
FIG. 14 is a view showing a method for allocating a dedicated channel preamble to dedicated channel resources according to an exemplary embodiment of the present invention.

FIG. 14 is a view showing a method for allocating a dedicated channel preamble to dedicated channel resources according to an exemplary embodiment of the present invention.

Referring to FIG. 14, a dedicated channel preamble having a length of 72 subcarriers is divided into 12 subcodes each including 6 subcarriers. The subcodes are respectively allocated to 12 mRBs. The same sequence is repetitively transmitted for a duration of 6 OFDM symbols.

When an event occurs, the transmitting terminal may stop data packet transmission and transmit the dedicated channel preamble.

In an example, when a reverse timing offset, estimated from a ranging signal transmitted from the receiving terminal to the transmitting terminal through a supplementary subchannel, exceeds a reference value, the transmitting terminal may transmit the dedicated channel preamble.

In another example, even when the PER (packet error rate) exceeds a reference value, the transmitting terminal may transmit the dedicated channel preamble.

In another example, when the transmitting terminal receives a preamble transmission request signal through a supplementary channel, the transmitting terminal may transmit the dedicated channel preamble.

Meanwhile, if a data packet transmitted before the transmission of the dedicated channel preamble includes information about whether to transmit the dedicated channel preamble and information about the transmission time point of the dedicated channel preamble, the receiving terminal can receive the dedicated channel preamble after decoding the dedicated channel for the corresponding time point.

Even though the data packet does not include information about whether to transmit the dedicated channel preamble and information about the transmission time point of the dedicated channel preamble, if the receiving terminal fails to decode the dedicated channel, the dedicated channel may be regarded as the dedicated channel preamble. The receiving terminal can detect the reception of the dedicated channel preamble by using a correlator.

The receiving terminal can estimate a frequency offset or time offset by using the dedicated channel preamble.

<Fourth Exemplary Embodiment>

In a fourth exemplary embodiment of the present invention, there is a method for allocating some of resources allocated for direct communication to a supplementary channel in order to achieve time synchronization and frequency synchronization between terminals performing direct communication.

Figure 15:
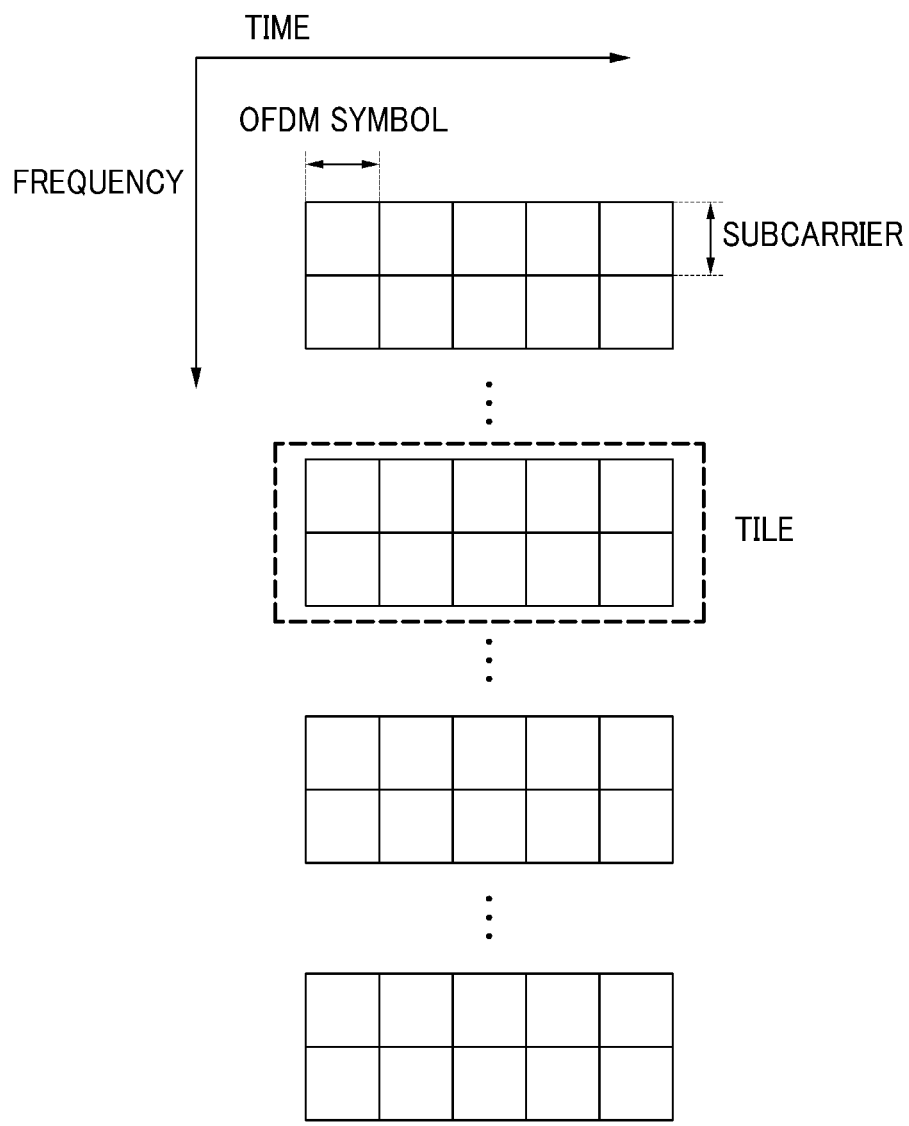
FIG. 15 is a view showing a resource allocation structure for a supplementary channel according to an exemplary embodiment of the present invention.

FIG. 15 is a view showing a resource allocation structure for a supplementary channel according to an exemplary embodiment of the present invention.

Referring to FIG. 15, a supplementary channel includes at least one tile (e.g., four tiles) distributed over the frequency domain. One tile may consist of (2 subcarriers*5 OFDM symbols). Therefore, performance gain and frequency diversity gain are attained by repeated transmissions in the time domain.

A ranging channel, a CQI (channel quality information) channel, and a feedback channel may be time-divided on the supplementary channel and alternately transmitted.

Figure 16:
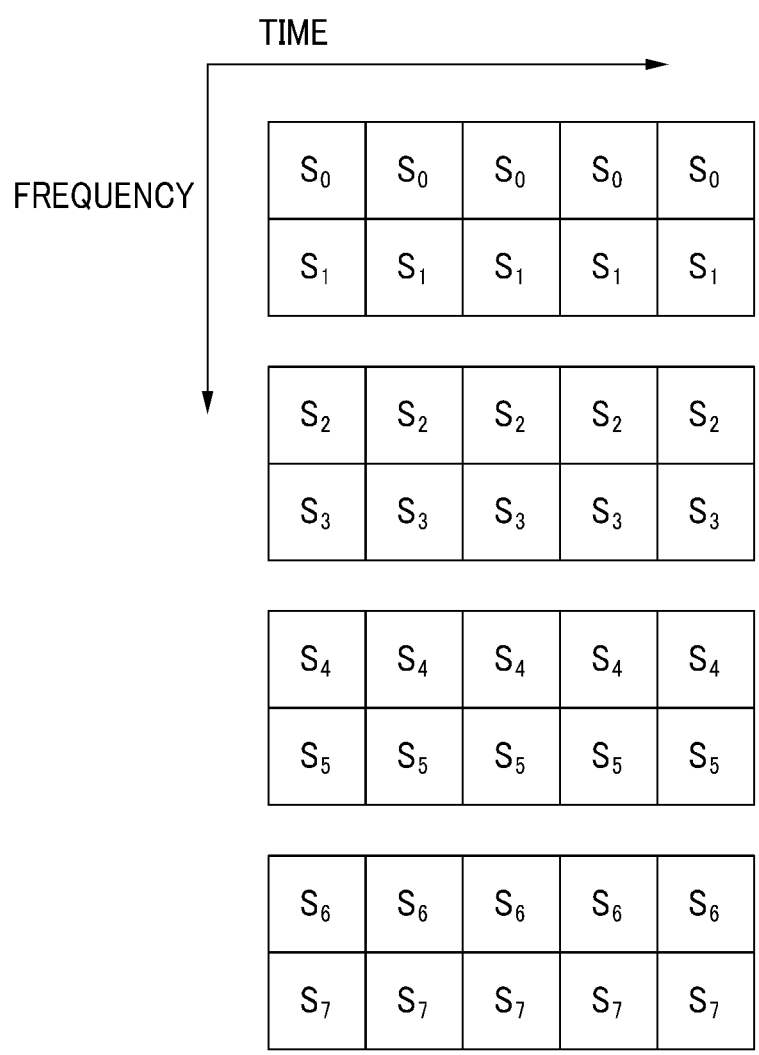
FIG. 16 is a view showing a method for allocating a ranging channel to supplementary channel resources according to an exemplary embodiment of the present invention.

FIG. 16 is a view showing a method for allocating a ranging channel to supplementary channel resources according to an exemplary embodiment of the present invention.

Referring to FIG. 16, a ranging channel having a length of 8 subcarriers is divided into 4 subcodes each including 2 subcarriers. The subcodes are respectively allocated to 4 tiles. Also, the same sequence is repetitively transmitted for a duration of 5 OFDM symbols. Sequence $S_k$ of the ranging channel is defined as in Equation 14.

$$[S_0 S_1 S_2 S_3 S_4 S_5 S_6 S_7] = [1,-1,-1,1,-1,1,1,-1] \quad \text{(Equation 14)}$$

The transmitting terminal periodically transmits the ranging channel, and the receiving terminal estimates time synchronization, frequency synchronization, and signal-to-noise ratio (SNR) by using the ranging channel.

The receiving terminal can increase the accuracy of estimation by using a cumulative result of periodically transmitted ranging channels.

The transmitting terminal corrects time synchronization or frequency synchronization by using an estimation result, or determines a CQI value transmitted in a direction opposite to the ranging channel.

Moreover, the receiving terminal may send a dedicated channel preamble request to the transmitting terminal by using an estimation result. The starting point (e.g., the position of a slot at which the transmission of the ranging channel starts) and cycle of transmission of the ranging channel may be defined during an initialization process of a link setup between terminals.

Figure 17:
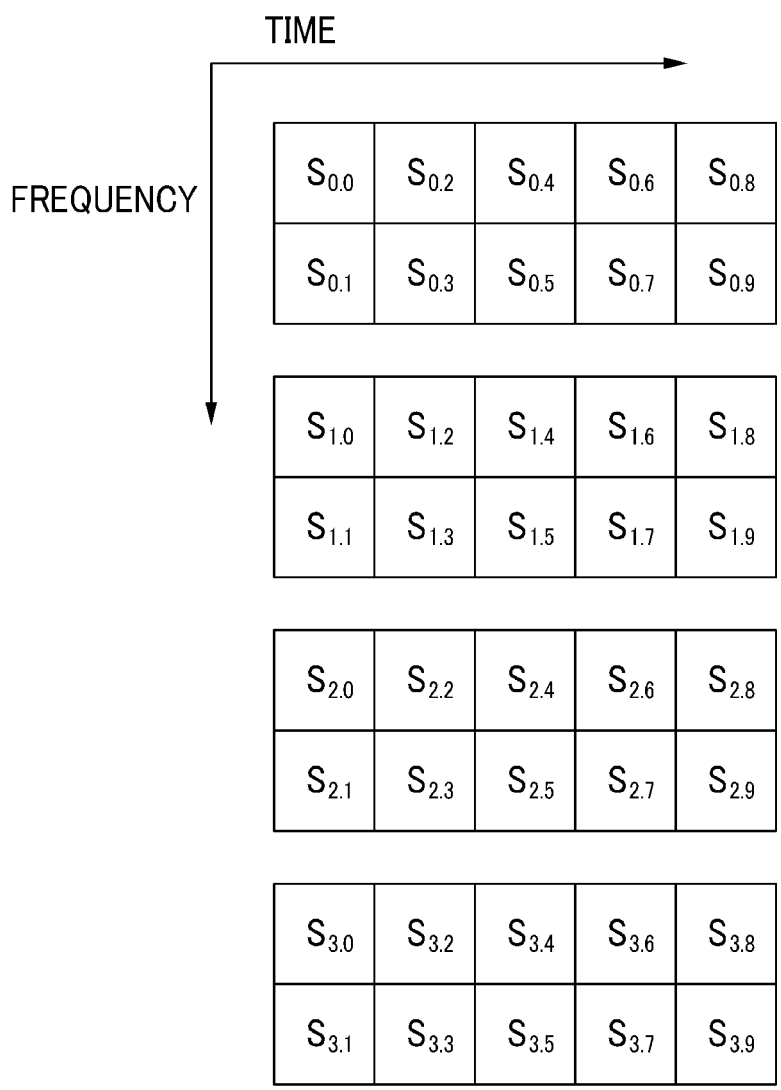
FIG. 17 is a view showing a method for allocating a CQI channel to supplementary channel resources according to an exemplary embodiment of the present invention.

FIG. 17 is a view showing a method for allocating a CQI channel to supplementary channel resources according to an exemplary embodiment of the present invention.

Referring to FIG. 17, four CQI codes with length 10 may be mapped to four tiles.

Figure 18:
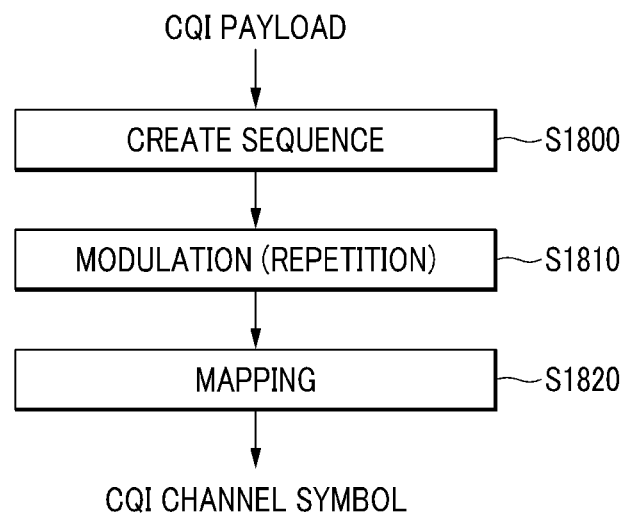
FIG. 18 shows a method of converting a CQI payload into a CQI code according to an exemplary embodiment of the present invention.

FIG. 18 shows a method of converting a CQI payload into a CQI code according to an exemplary embodiment of the present invention.

Referring to FIG. 18, a sequence corresponding to a CQI payload is created based on the definitions in Table 2 (S1800).

TABLE 2

| Index | Sequence | Usage |
|---|---|---|
| 0 | 1111111111 | level 0 |
| 1 | 0010110001 | level 1 |
| 2 | 0100100110 | level 2 |
| 3 | 1001101000 | level 3 |
| 4 | 1011000100 | level 4 |
| 5 | 0110001010 | level 5 |
| 6 | 0000011101 | level 6 |
| 7 | 1101010011 | level 7 |
| 8 | 1100011000 | Reserved |
| 9 | 0001010110 | Reserved |
| 10 | 0111000001 | Reserved |
| 11 | 1010001111 | Reserved |
| 12 | 1000100011 | Reserved |
| 13 | 0101101101 | Reserved |
| 14 | 0011111010 | Reserved |
| 15 | 1110110100 | Reserved |

Here, the index is determined using the SNR of a terminal transmitting through a CQI channel. The SNR may be estimated based on a dedicated channel preamble, a dedicated channel pilot, a ranging channel, etc. Although Table 2 shows an example of transmission of 3-bit information through the CQI channel, various modifications can be made.

A sequence is modulated and repeated (S1810), and mapped to symbol s[k] (S1820). For example, sequence 0 may be modulated into symbol 1, and sequence 1 may be modulated into symbol −1.

A symbol is created as a CQI code according to Equation 15.

$$C_{i,j} = s[K_i[j]], \text{ for } i=0, 1, 2, 3, 0 \le j \le 9 \quad \text{(Equation 15)}$$

Here, $K_i[j]$ denotes the j-th element of $K_i$, and $K_i$ that is equal to four tiles is defined as in Equations 16 through 19.

$$K_0 = \{0,1,2,3,4,5,6,7,8,9\} \quad \text{(Equation 16)}$$

$$K_1 = \{2,3,4,6,7,8,9,0,1,5\} \quad \text{(Equation 17)}$$

$$K_2 = \{8,9,2,3,4,5,6,7,0,1\} \quad \text{(Equation 18)}$$

$$K_3 = \{5,6,7,8,9,0,1,2,3,4\} \quad \text{(Equation 19)}$$

Accordingly, the CQI channel may include a maximum of 4-bit information.

The CQI channel may be periodically transmitted. The starting point and cycle of transmission of the CQI channel may be defined during an initialization process of a link setup between terminals. At this point, the link setup has to be made such that the ranging channel and the CQI channel do not overlap with each other.

A receiving terminal that receives the CQI channel may decode the index by using a non-coherent demodulation method. To increase the decoding performance, a correlation value between sequences should be as low as possible (e.g., 2 or less). A correlation value between an m-th sequence and an n-th sequence may be defined as in Equation 20.

$$r_{m,n} = \sum_{k=0}^{9} (1 - 2b_{m,k})(1 - 2b_{n,k}) \quad \text{(Equation 20)}$$

Here, $b_{i,k}$ denotes the k-th bit of an i-th sequence.

The feedback channel may be allocated supplementary channel resources in the same method as the CQI channel. The feedback channel may contain an ACK notifying of proper decoding of a data packet received through a dedicated channel, a NAK (indicative of a transmission frame according to HARQ) notifying of the failure of decoding of the data packet received through the dedicated channel, an MCS change confirm notifying of proper reception of an MCS change request message, an RCHG (resource change) indication notifying of proper reception of a resource change request, a Send Indication notifying, in advance, of the transmission of a broadcast message such as RTS and CTS, and so on.

Table 3 shows the sequences corresponding to the information contained in the feedback channel.

TABLE 3

| Index | Sequence | Usage |
|---|---|---|
| 0 | 1111111111 | ACK |
| 1 | 0010110001 | NAK for frame 0 |
| 2 | 0100100110 | NAK for frame 1 |
| 3 | 1001101000 | NAK for frame 2 |
| 4 | 1011000100 | NAK for frame 3 |
| 5 | 0110001010 | MCS Change Confirm |
| 6 | 0000011101 | RCHG Indication |
| 7 | 1101010011 | Reserved |
| 8 | 1100011000 | Send Indication |
| 9 | 0001010110 | Reserved |
| 10 | 0111000001 | Reserved |
| 11 | 1010001111 | Reserved |
| 12 | 1000100011 | Reserved |
| 13 | 0101101101 | Reserved |
| 14 | 0011111010 | Reserved |
| 15 | 1110110100 | Reserved |

When using one of the sequences of the feedback channel for the Send Indication, the same sequence cannot be used for the CQI channel. For example, if index 8 of the feedback channel has been allocated for the Send Indication, index 8 of the CQI channel cannot be used. This is because a terminal is not aware of the starting point and cycle of transmission of the CQI channel and thus cannot distinguish the CQI channel and the feedback channel from each other, unless the terminal itself transmits and receives the RTS or CTS.

As described above, the ranging channel, the CQI channel, and the feedback channel are transmitted via the supplementary channel. Accordingly, a terminal receiving the supplementary channel has to distinguish whether it is the ranging channel, CQI channel, or feedback channel. If the terminal is aware of the starting point and cycle of transmission of at least one of the ranging channel, CQI channel, and feedback channel, it can distinguish them based on such information.

If the supplementary channel is the ranging channel, the terminal detects a ranging code by using the structure of FIG. 16. Using the ranging code, the terminal estimates a time error or frequency error, and estimates the SNR.

If the supplementary channel is the CQI channel, information contained in the CQI channel can be decoded using the correspondence relationship between the CQI payloads and the sequences of Table 2.

If the supplementary channel is the feedback channel, the information contained in the feedback channel can be decoded using the correspondence relationship between the feedback information and the sequences of Table 3.

A terminal is not aware of the starting point and cycle of transmission of at least one of the ranging channel, the CQI channel, and the feedback channel, unless the terminal itself transmits and receives the RTS or CTS. Accordingly, a terminal having received the supplementary channel can distinguish the channels by using the sequences. That is, a CQI sequence defined in Table 2 and a ranging sequence are compared with a received signal to find a sequence closest to the received signal. As used herein, the ranging sequence may be defined as in Equation 21.

$$[b_9 b_8 b_7 b_6 b_5 b_4 b_3 b_2 b_1 b_0] = [0101010101] \quad \text{(Equation 21)}$$

Here, the ranging sequence is obtained by allocating sequence $S_k$ of the ranging channel, defined in Equation 14, as shown in FIG. 16. The ranging sequence is merely an example, and a correlation value between the ranging sequence and a sequence used for the CQI channel or feedback channel should be set as low as possible.

If the signal received by the terminal is closest to Equation 21, the terminal identifies the corresponding supplementary channel to be the ranging channel.

On the other hand, if the signal received by the terminal is closest to a sequence corresponding to the Send Indication of Table 3, the terminal identifies the corresponding supplementary channel to be the feedback channel. The Send Indication indicates the transmission of a broadcast message such as the RTS or CTS. Hence, the corresponding dedicated channel is received.

Otherwise, the terminal identifies the corresponding supplementary channel to be the CQI channel or the feedback channel.

Figure 19:
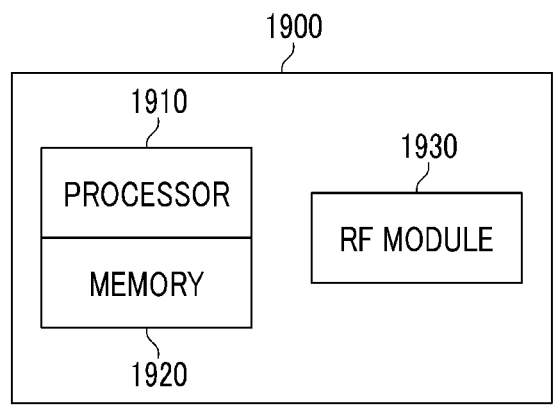
FIG. 19 illustrates a terminal applicable to an exemplary embodiment of the present invention.

FIG. 19 illustrates a terminal applicable to an exemplary embodiment of the present invention.

Referring to FIG. 19, a terminal 1900 includes a processor 1910, a memory 1920, and a radio frequency (RF) unit 1930. The processor 1910 may be configured to implement the procedures and/or methods proposed in the present invention. The memory 1920 is connected to the processor 1910, and stores various information related to the operation of the processor 1910. The RF unit 1930 is connected to the processor 1910, and transmits and/or receives a radio signal. The terminal 1900 may have a single antenna or multiple antennas.

According to an exemplary embodiment of the present invention, a method for performing direct communication between terminals can be achieved.

Particularly, interference between a cellular communication signal and a direct communication signal can be reduced, and frequency synchronization and time synchronization between terminals performing direct communication can be efficiently performed.

Moreover, a synchronization channel structure for synchronization between terminals performing direct communication and a preamble transmission method can be attained. Further, dedicated channel and supplementary channel structures allocated for direct communication can be attained.

Embodiments of the present invention are not only realized by the method and device, but also realized by a program for realizing the functions corresponding to the configuration of embodiments of the present invention or a recording medium for recording the program, which can be easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a first terminal to perform direct communication between terminals, the method comprising
performing direct communication with at least one second terminal by using resources allocated for direct communication between terminals,
wherein the resources comprises a synchronization channel used for frequency synchronization and time synchronization between terminals,
wherein
the synchronization channel comprises a synchronization channel preamble used for at least one of preamble detection, time offset estimation, frequency offset estimation, or channel estimation, and
the synchronization channel preamble comprises at least a sequence based on a Fast Fourier Transform (FFT) sample length.

2. The method of claim 1, wherein the synchronization channel preamble is either a first sequence in which a basic pattern having an $N_{FFT}/2$ sample length is repeated or a second sequence formed by combining the basic pattern with a pattern obtained by multiplying the basic pattern by −1, where the $N_{FFT}$ is the size of FFT.

3. The method of claim 2, wherein
at least one OFDM (orthogonal frequency division multiplexing) symbol is used to transmit the synchronization channel preamble, and
a time domain preamble, which is formed by repeating the basic pattern two times or combining the basic pattern with a pattern obtained by multiplying the basic pattern by −1, is repeated several times during at least one OFDM symbol.

4. The method of claim 3, wherein the time domain preamble is repeated (3+α) times during at least one OFDM symbol, wherein the α is $2N_{CP}/N_{FFT}$, and the $N_{CP}$ is the length of a CP (cyclic prefix).

5. The method of claim 2, wherein the first sequence or second sequence is defined by a binary code generated by a PRBS (pseudo random binary sequence) used for range code creation, and the initial value of the PRBS is b14 . . . b0 = 1,1,0,1,0,1,0,0,0,0,0,0,0,0,0.

6. The method of claim 5, wherein the first sequence is defined $$S_k^0 = \begin{cases} 0, & k = 0, 2, \ldots, 70 \\ 1 - 2 \times C_k, & k = 1, 3, \ldots, 71, \end{cases}$$

the second sequence is defined by $$S_k^1 = \begin{cases} 1 - 2 \times C_k, & k = 0, 2, \ldots, 70 \\ 0, & k = 1, 3, \ldots, 71, \end{cases}$$

$C_k$ is a binary code generated by the PRBS, and $C_0$ is the first output of the PRBS.

7. The method of claim 2, wherein the first terminal selects one of the first and second sequences to generate the synchronization channel preamble, and the second terminal detects both the first sequence and the second sequence.

8. The method of claim 1, wherein
three OFDM symbols are used to transmit the synchronization channel preamble, and
among the three OFDM symbols, the first OFDM symbol comprises a CP, and the second OFDM symbol and the third OFDM symbol do not comprise the CP.

9. The method of claim 1, wherein, if 72 consecutive subcarriers are allocated to the synchronization channel, the synchronization channel preamble is mapped to 36 subcarriers.

10. A method for a first terminal to perform direct communication between terminals, the method comprising
performing direct communication with at least one second terminal by using resources allocated for direct communication between terminals,
the resources comprising a dedicated channel for transmitting a data packet or a dedicated channel preamble for time offset estimation or frequency offset estimations;

wherein the dedicated channel preamble is transmitted in response to an event indicating that a timing offset or an error rate exceeds a reference value.

11. The method of claim 10, wherein the dedicated channel preamble has a length of 72 subcarriers, and is divided into 12 subcodes each having 6 subcarriers.

12. The method of claim 10, wherein the dedicated channel preamble is repeatedly transmitted for a duration of 6 OFDM symbols.

13. The method of claim 10, wherein a sequence of the dedicated channel preamble is defined by a binary code generated by a PRBS used for range code creation, and the initial value of the PRBS is b14 ... b0 =1,1,0,1,0,1,0,0,0,0,0,0,0,0,0.

14. The method of claim 13, wherein the sequence of the dedicated channel preamble is $S_k=1-2 \times C_k$, k=72,73,...,143, $C_k$ is a binary code generated by the PRBS, and $C_0$ is the first output of the PRBS.

15. A method for a first terminal to perform direct communication between terminals, the method comprising performing direct communication with at least one second terminal by using resources allocated for direct communication between terminals, the resources comprising a supplementary channel for mapping and transmitting at least one of a ranging channel, a CQI (channel quality information) channel, or a feedback channel, wherein the feedback channel is transmitted in a different time domain from that of the ranging channel or CQI channel.

16. The method of claim 15, wherein at least one of the ranging channel, the CQI channel, and the feedback channel is transmitted in a time-division manner.

17. The method of claim 15, wherein a CQI code transmitted through the CQI channel is determined by using SNR (Signal to Noise Ratio) estimated by at least one of a dedicated channel preamble, a dedicated channel pilot, and the ranging channel.

18. The method of claim 15, wherein at least one of the ranging channel, the CQI channel, and the feedback channel is periodically transmitted according to the starting point and cycle of transmission determined during link initialization.

19. The method of claim 15, wherein the feedback channel comprises at least one of the following information: ACK, NAK, MCS change confirm, RCHG indication, and Send Indication.

* * * * *